United States Patent [19]
Peterson

[11] 3,793,982
[45] Feb. 26, 1974

[54] REVERSE MOTION ALARM

[76] Inventor: Edwin R. Peterson, 3109 Bogus Basin Rd., Boise, Idaho 83702

[22] Filed: Apr. 2, 1973

[21] Appl. No.: 346,976

[52] U.S. Cl. ................................. 116/60, 116/158
[51] Int. Cl. .......................................... B60q 5/00
[58] Field of Search ....... 116/35, 36, 37, 56, 57, 60, 116/61, 67, 73, 74, 115, 155, 156, 158, 164, 167; 180/106; 340/392

[56] References Cited
UNITED STATES PATENTS

| | | | |
|---|---|---|---|
| 773,565 | 11/1904 | Hakes | 116/57 |
| 1,327,993 | 1/1920 | Goldblatt | 116/56 |
| 2,244,431 | 6/1941 | Piccardi | 116/167 X |
| 2,900,948 | 8/1959 | Krynak | 116/60 |
| 2,915,036 | 12/1959 | Bookwalter | 116/56 X |
| 2,957,443 | 10/1960 | Carlisle | 116/57 X |
| 2,979,020 | 4/1961 | Von Radics | 116/60 |
| 3,072,092 | 1/1963 | Krynak | 116/60 |
| 3,039,423 | 6/1962 | Warn | 116/60 |
| 3,048,142 | 8/1962 | Warn | 116/60 |

*Primary Examiner*—Louis J. Capozi
*Attorney, Agent, or Firm*—J. Gibson Semmes

[57] ABSTRACT

A reverse motion alarm, which may be mounted anywhere on a vehicle or machine in proximity to a rotating or translating member whose direction of rotation changes with the direction of motion of the vehicle or machine, may include a friction wheel driven by the rotating or translating member, a shaft-mounted overrunning clutch which transmits rotation in one direction only, a cam driven through the clutch and a spring biased clapper mechanism actuated by the cam which rings a bell upon reverse movement of the vehicle or machine.

4 Claims, 2 Drawing Figures

REVERSE MOTION ALARM

FIELD OF THE INVENTION

Numerous devices are known which will provide an audible warning signal when a vehicle or machine is set in motion. Generally, the signal is made only in the reverse direction since the operator then has a more restricted view of the objects and persons in the path of the vehicle or machine. In the applicant's U.S. Pat. No. 3,629,819 is disclosed such a device comprising an electronic circuit which sounds an alarm when the vehicle is in reverse motion. The present invention is of simple mechanical design and requires no knowledge of electronics for its complete installation.

DESCRIPTION OF THE PRIOR ART

In the past there have been numerous mechanical devices suited for providing alarms during vehicle motion; however, none of the known devices anticipate or suggest the simple, novel arrangement of parts of this invention. U.S. Pat. No. 2,900,948 to Krynak (Class 116, Subclass 60) shows a warning signal for a rail car in which a wheel is driven by friction from the rail car wheel, thereby rotating a shaft and clapper mechanism which rings a bell regardless of the direction of motion of the vehicle. This device includes a gravity actuated clapper mechanism, compared to the applicant's unique cam-driven, spring-biased system. U.S. Pat. No. 2,915,036 to Bookwalter (Class 116, Subclass 35) shows a signal device in which an impact member is permitted to roll into contact with a bell upon rotation of the guide tube carrying the impact member in one direction but is prevented from striking the bell upon rotation of the guide tube in the opposite direction. This device must be mounted to the hub of the vehicle wheel where it interferes with vehicle tire maintenance, is subject to damage from impact by flying objects or objects close to the vehicle and to clogging or blocking of the guide tube due to mud, grease and grime. The present device is suited for mounting in the protected area of the drive shaft and thus is not susceptible to such damage, and, due to the unique, open geometry of the elements of the invention, tends to be self-cleaning. U.S. Pat. No. 2,957,443 to Carlisle (Class 116, Subclass 56) shows a reverse movement alarm mounted around the drive shaft of the vehicle which includes a ratcheting mechanism which rings a bell in one direction but not in the other. The present device represents an improvement over this patented apparatus in that it mounts in a simple fashion directly to the frame or other structural member of the vehicle rather than around the drive shaft which would appear to require disassembly of the drive train for installation of the warning device.

U.S. Pat. No. 2,979,020 to Von Radics shows an alarm system which includes a drive input from the vehicle transmission, an overrunning clutch, a flexible draft shaft leading to the bell ringing mechanism and a centrifugally actuated bell ringer. This device requires a rather complex mounting arrangement on the vehicle in contrast to the applicant's simple, universal bolt-on arrangement; and has a clapper mechanism quite different from and inferior to the within uniquely cam-driven, spring-biased system. U.S. Pat. No. 3,039,423 to Warn shows a safety alarm wherein a wheel-mounted, counter-balance activated cam system moves and releases the spring-biased bell ringing hammer. This system is susceptible to freezing in-place due to mud, grease and grime and does not show the applicant's unique bell ringing hammer which is driven into contact with the bell by the biasing spring to produce louder warning sounds than possible with the flexibly mounted arm of the patent. U.S. Pat. No. 3,072,092 to Krynak shows another warning system in which a friction wheel drives a shaft having a cam element mounted thereon which actuates a bell-ringing mechanism. The invention within represents an improvement over this apparatus in that the simple overrunning clutch replaces the complex spring system of the patented device.

SUMMARY OF THE INVENTION

An object of this invention is to eliminate such above-noted problems as have been encountered with prior art devices by providing a mechanically simple reverse motion alarm which is easy to install and maintain, does not interfere with the function or maintenance of any other component of the vehicle or machine and may be installed in a variety of locations near a rotating or linearly moving member of the vehicle or machine whose direction of movement changes with the vehicle's or machine's direction. To these ends there are provided a mounting frame of simple geometry having a shaft mounted thereon on suitable bearings. Also affixed to the frame are one or more bell-ringing hammers, spring biased into close proximity to an adjacent bell, which may be mounted on the frame or on the shaft. Located on the shaft in proximity to the hammer is a cam of suitable shape having one or more lobes which will engage the hammer as the cam rotates with the shaft; move the hammer against the action of its spring; and release the hammer to cause it to strike the bell under the return action of the spring. The hammer then returns to a neutral position awaiting the next contact by the cam. Also located on the shaft is an overrunning clutch of known variety which will transmit motion to the shaft in one direction only. Mounted on the input side of the overrunning clutch is a wheel and tire assembly or similar apparatus which is driven by the movement of the rotating or linearly moving member of the vehicle. When the vehicle or machine moves in the reverse direction, the clutch transmits motion to the cam, which moves the hammer and releases it, causing the bell to ring.

DESCRIPTION OF THE PREFERRED EMBODIMENT

Figure 2:
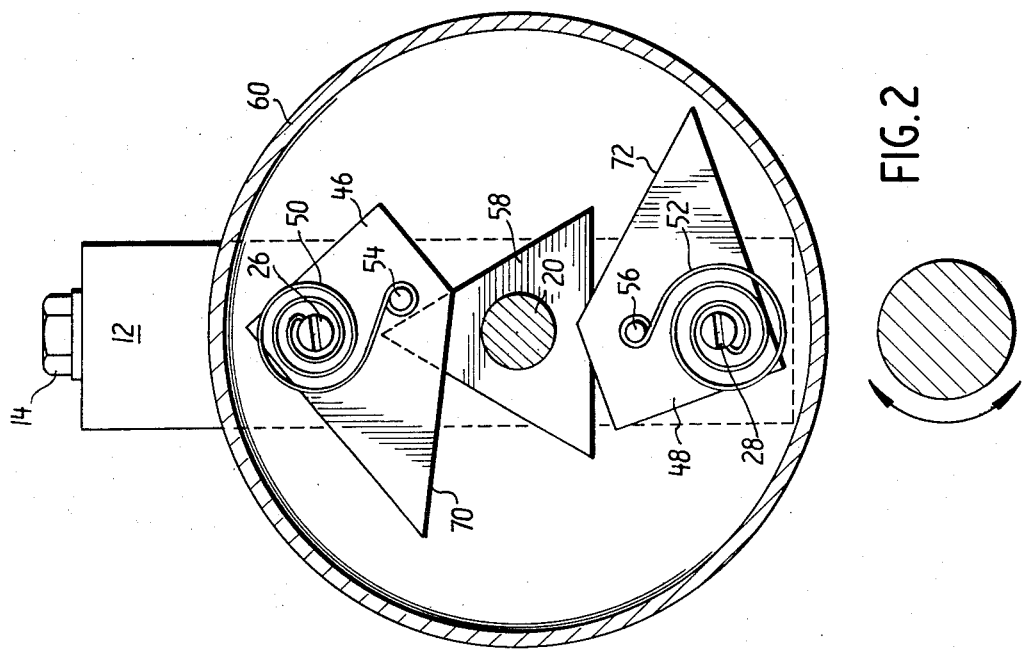
FIG. 2 shows a cut-away front view of the invention, taken along line 2—2 in FIG. 1.

There follows a description of the preferred embodiment of the invention, reference being made to the figures of the drawing wherein like reference numerals designate like elements of structure in the two figures.

Attached to vehicle or machine frame 10 or other structural member is the mounting frame 12 of the invention, having a suitable connecting fastener 14. Frame 12 may include an aperture 16 in which may be mounted bearing assembly 18. Mounted within bearing assembly 18 is shaft 20 rotatable freely therein. Frame 12 may further include apertures 22 and 24 having hammer pivot posts 26 and 28 mounted therein. Pivot posts 26 and 28 may include threaded ends 30 and 32 for receiving nuts 34 and 36; and integral collar segments 38 and 40 for abutting frame 12 at one end. The other ends of collars 38 and 40 may abut bushings 42 and 44, or other sleeve-type bearing, on which may be mounted bell-ringing hammers 46 and 48. Hammer return springs 50 and 52 may also be mounted on pivot posts 26 and 28 outwardly of the hammers, with one end of each spring secured to its respective pivot post. The other end of each return spring may be affixed to cam follower pins 54 and 56 mounted in and extending through hammers 46 and 48. By adjusting the tension of springs 50 and 52, the force with which the hammers strike the bell and, hence, the sound level of the bell may be varied. Slots 74 and 76 are provided for tension adjustment.

Attached to shaft 20 is hammer actuating cam 58, located so as to permit the cam to contact and move cam follower pins 54 and 56 as cam 58 rotates with shaft 20. In the preferred embodiment, bell 60 is mounted on and moves with shaft 20, which tends to shake out dirt, grease and grime which would otherwise accumulate within the bell and could interfere with the operation of the hammers and muffle the sound of the bell. Of course, the bell may alternately be mounted on frame 12 or otherwise as may be convenient and still permit the hammers to strike it when shaft 20 is rotating. Also mounted on shaft 20 is overrunning clutch assembly 62 on the input side of which may be mounted a wheel 64 having a tire 66 mounted thereon. Locknut 68 secures the assembly to shaft 20. Tire 66, or other suitable surface, may be placed in contact with a rotating or linearly moving member of the vehicle or machine to actuate the assembly when the vehicle or machine moves in reverse.

Figure 1:
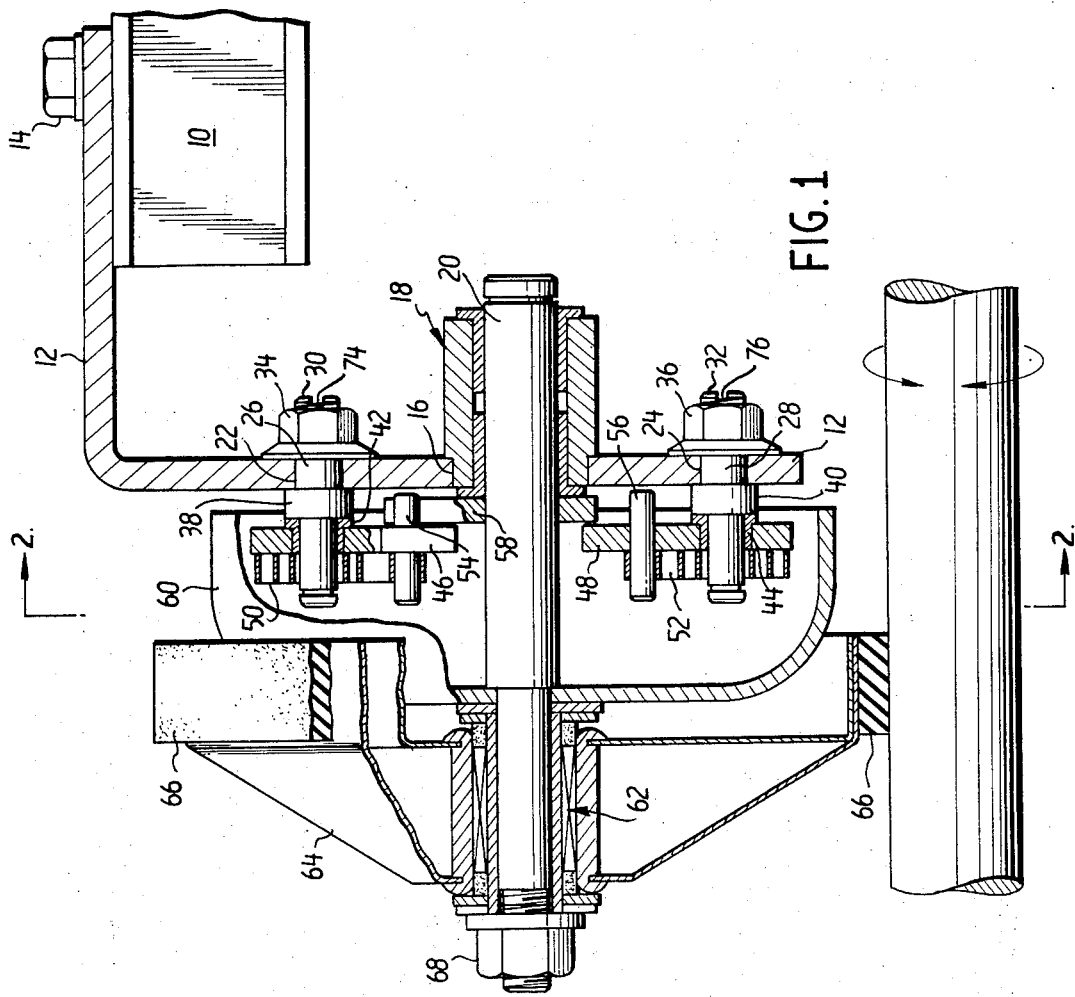
FIG. 1 shows a side elevation view, partially cut-away and partially in section, of the invention.

FIG. 2 shows a view taken along line 2—2 of FIG. 1, and indicating more clearly the geometry of the preferred embodiment. Hammers 46 and 48 may be made from rigid metal plate stock from essentially rectangular blanks from which one side, one corner and a portion of another side are removed to form diagonal sides 70 and 72, which permit the hammers to rotate about pivot posts 26 and 28 without contacting shaft 20. This permits very compact arrangement of the parts. The hammers may also be installed in the reverse of their illustrated positions, i.e., turned over facing oppositely, to provide the flexibility of actuation upon movement of shaft 20 in the opposite direction to that shown. Of course, additional hammers could be added as desired to provide more rings per revolution of cam 58. Hammer actuating cam 58 may have one or a plurality of actuating lobes, such as the three lobes shown, as desired to produce more or less rings per revolution.

Other modifications which may occur to those in the art and which are within the spirit of the invention might include the direct mounting of the drive wheel upon the shaft so that the device will be actuated regardless of the direction of motion of the vehicle. The inventive apparatus may also be used as a warning device on a conveyor belt, for the fast return of the carriage on a large lathe or milling machine, on the drive pulleys of overhead cranes, on the raising mechanism of a dump truck and similar applications.

Having described my invention in such detail as to enable one skilled in the art to make and use it, I claim:

1. A reverse motion alarm for an apparatus having a moving member whose direction of movement changes with the direction of movement of the apparatus, comprising:
   A. a frame member adapted for mounting upon the apparatus;
   B. bearing means mounted in the frame member;
   C. a shaft mounted in the bearing means for rotation therein;
   D. a cam mounted on the shaft, the cam having at least one lobe;
   E. means connected to the shaft for producing a rotating motion in the shaft only in a reverse direction of movement of the moving member;
   F. means attached to the frame member for actuating a sound producing means in response to contact by the at least one cam lobe; and
   G. means for producing an alarm sound in response to the actuating means.

2. The apparatus of claim 1, wherein the means for producing a rotating motion comprises:
   E-1. a wheel adapted to be driven by the moving member; and
   E-2. an overrunning clutch mounting the wheel to the shaft for transmitting the rotation of the wheel to the shaft.

3. The apparatus of claim 1, wherein the alarm producing means comprises a bell mounted on the shaft for rotation therewith.

4. The apparatus of claim 1, wherein the means for actuating a sound producing means comprises:
   F-1. a pivot post mounted to the frame member;
   F-2. at least one alarm actuating hammer mounted on the pivot post for rotation thereabout;
   F-3. spring means for biasing the hammer into contact with the alarm sound producing means; and
   F-4. cam follower pin means mounted on the hammer for coaction with the cam lobe, whereby the hammer is moved away from the sound producing means as the cam lobe rotates and be released to actuate the sound producing means under the action of the spring means.

* * * * *